Patented Sept. 21, 1954

2,689,791

UNITED STATES PATENT OFFICE 2,689,791

PROCESS FOR RECOVERING SODIUM FROM SLUDGE

James C. Boag, Geneva, N. Y., assignor to Ethyl Corporation, New York, N. Y., a corporation of Delaware No Drawing. Application October 30, 1951,
Serial No. 253,991

2 Claims. (Cl. 75—66)

My invention relates broadly to a process for recovering alkali metal from a mixture containing alkali metal and an alkaline earth metal, and more particularly to a process for the recovery of sodium from admixture with calcium crystals.

Metallic sodium is produced commercially by an electrolytic process wherein fused sodium chloride is subjected to electrolysis. The melting point of pure sodium chloride, however, is above the boiling point of sodium metal so that if the process were attempted using pure sodium chloride the sodium which would be formed would be immediately vaporized. For this reason it is common practice to add a fluxing agent such as calcium chloride to the electrolyte for the purpose of reducing its melting point to below the boiling point of sodium metal. Such use of a fluxing agent is, however, accompanied by additional problems. As the sodium is produced at the cathode of the cell the calcium chloride is also electrolyzed and calcium metal is formed at the cathode along with the sodium. At the temperature of the fused electrolyte some of this calcium dissolves in the sodium melt. Upon removal of the crude sodium-calcium melt from the cell the mixture is cooled and most of the calcium crystallizes. This crude sodium mixture containing the calcium crystals is then purified, usually by mechanical separation so as to recover some of the sodium in substantially pure form. The by-product of this separation is a sludge or residue which consists of a mixture of solids containing crystals of calcium embedded in a matrix of sodium and also some impurities such as the various oxides and chlorides of sodium and calcium. The amount of metallic sodium in this sludge or residue averages about 70% by weight, and the amount of metallic calcium varies between about 15 and 30%.

As can be seen from the above composition of this electrolytic sludge, it would be extremely advantageous from the commercial standpoint if the metallic sodium could be recovered therefrom in substantial yields. This problem has plagued industry for a number of years and is complicated by the fact that the electrolytic sludge is extremely difficult to handle. Prior attempts have been made to either recover the sodium from the sludge or dispose of the sludge in some convenient manner, but such attempts have never resulted in a practical commercial operation. For example, it has been common practice to return the sludge to an electrolytic cell for the purpose of recovering some of the sodium. This process, in addition to being uneconomical, is extremely hazardous. It has also been proposed to dispose of this sludge by means of burning but here again the process is both hazardous and unattractive from the commercial standpoint since the various salts and oxides that are formed upon burning have no commercial value and must be wasted. Another method which has been proposed as a means of utilizing the sludge consists of treating the sludge with an alcohol which selectively reacts with the sodium to form alcoholate leaving the calcium crystals undissolved. While this method does produce pure calcium crystals as a useful commercial product, the sodium alcoholate which is formed has had little commercial value and the process is therefore wasteful of sodium.

While the above relates to the manufacture of sodium a similar problem exists whenever an alkali metal is produced by an electrolytic process employing fused salts resulting in mixtures, for example, of potassium and magnesium, lithium and barium and the like. Accordingly, it is an object of my invention to overcome these disadvantages present in the prior art and provide a new and improved process for economically recovering alkali metal from mixtures containing such alkali metal and an alkaline earth metal. It is a particular object of my invention to recover sodium from admixture with calcium metal. It is another object of my invention to provide a process for recovering metallic sodium from mixtures such as the electrolytic sludge obtained in sodium manufacture which contain sodium in admixture with calcium crystals. Still another object of my invention is to produce a mixture rich in metallic calcium from a crude mixture of sodium and calcium so as to permit economical recovery of pure calcium from said rich mixture.

These and other objects of my invention will be apparent as the following description proceeds and the features of novelty which characterize my invention will be pointed out with particularity in the claims annexed to and forming a part of this specification.

Although applicable in general to mixtures of alkali metals and alkaline earth metals, for the sake of brevity the further description of my invention will refer primarily to mixtures of sodium and calcium. Briefly, I accomplish the objects of one embodiment of my invention by filtering the heated mixture containing metallic sodium and an alkaline earth metal using a filter medium having openings which are actually larger than a substantial portion of the alkaline earth metal particles or crystals present in the mixture. The filtration is aided by maintaining a moderate pressure differential across the filter medium, and throughout the filtration the mixture is maintained at a temperature at which the sodium is in the molten state. The molten sodium passes through the filter medium and is collected as filtrate while the alkaline earth metal particles or crystals are retained upon the filter medium.

The process of my invention can best be described in relation to the recovery of sodium from the electrolytic sludge which contains sodium in admixture with calcium crystals. As previously pointed out, this sludge which is produced as a by-product in the electrolytic manufacture of sodium has a metallic sodium content which averages about 70% by weight and a calcium content which varies between about 15–30% by weight. The calcium is present in the form of various size crystals which are embedded in a matrix of the sodium metal. These crystals have been found to have a size range in which the major diameter of the crystals varies from approximately 1/8 of an inch to 1/300 of an inch. With knowledge of these facts I attempted to recover the sodium from the sludge by a filtration process wherein a filter medium was used having openings which were small enough to hold the smallest of the calcium crystals, that is, openings of less than .00333 inch. The filtration was very slow and I found it necessary to use a hydraulic pressure of the order of 1000 pounds per square inch to aid the filtration in order to recover any appreciable quantities of sodium. In many cases pressures in excess of this value were necessary. In addition to the disadvantage of having to employ such high pressures the process suffered from the fact that the filter medium would frequently become clogged, and as a result the process was abandoned as being essentially inoperable.

I have subsequently discovered, however, that metallic sodium can be successfully and economically recovered from the electrolytic sludge by filtering the sludge using a relatively coarse filter medium having openings which are actually larger than a substantial portion of the calcium crystals present in the sludge. Surprisingly, even the fine calcium crystals are retained in the filter cake and the sodium filtrate which is obtained is substantially free of calcium. Up to 80% of the sodium originally present in the sludge can be recovered as filtrate which has been found to contain less than 4% calcium. Frequently the calcium content of this filtrate has been observed to be less than 1%. Furthermore, my process can be carried out using only a very moderate pressure differential across the filter cake to assist filtration. For example, when the sludge was filtered using a U. S. standard 20 mesh screen as a filter medium and a pressure differential of only 4 pounds per square inch was applied across the filter medium, 62% by weight of the sodium was recovered as filtrate, and the calcium content of this filtrate was only 0.40% by weight. As previously pointed out, the calcium crystals vary in size from a major diameter of 1/8 of an inch down to 1/300 of an inch and when it is realized that U. S. standard 20 mesh screen has openings of .0328 inch, approximately 10 times larger than the smaller crystals, the uniqueness of my improved process becomes apparent.

As previously pointed out, for the successful operation of my process a filter medium should be employed having openings which are larger than the smaller of the alkaline earth metal crystals present in the mixture. I have found, however, that these openings should not be excessively large and in general should not be larger than the largest of the alkaline earth particles or crystals present in the mixture. I prefer, however, to utilize a filter medium in which the openings are of the order of at least 5 times larger than the smaller of the alkaline earth crystals. While my process is operable using finer filter mediums than specified above as my preferred range I have found that the ultimate yield of sodium recovery is somewhat reduced. For example, when a U. S. standard 100 mesh screen is employed in the filtration of the previously described electrolytic sludge 25% by weight of the sodium can be recovered using a pressure differential of not more than 5 pounds per square inch to aid filtration, and the filtrate under such conditions has been found to contain less than 1% calcium by weight. The U. S. standard 100 mesh screen has openings of .0058 inch, that is, appreciably larger than the smaller of the calcium crystals present in the sludge. When this sludge was filtered under similar conditions using, for example, a U. S. standard 35 mesh screen as a filter medium which has openings falling within my preferred size range the sodium recovery was found to be above 50% by weight, and when a U. S. standard 8 mesh screen was employed a sodium recovery of 82% by weight was obtained. These results merely demonstrate the effect of carrying out my process under my preferred conditions as specified above.

In applying my process to the recovery of sodium from the above described electrolytic sludge, for example, the sludge is heated to a temperature at which the sodium is in the molten state. In general I have found that it is not necessary to heat the sludge to above 130° C. as at this temperature the sodium is sufficiently fluid so as to be filtered readily. This heating can be accomplished while the sludge is contained in a storage vessel or can be done after the sludge has been placed in the filtration apparatus. For continuous operation, however, it is preferred that the sludge be in the fluid state prior to introduction into the filtration apparatus since this will simplify the materials handling problems. In any event, the filtration is carried out while maintaining the sludge in this heated condition. To assist filtration a moderate pressure differential is maintained across the filter medium and in general this differential need not exceed 20 pounds per square inch. In most cases a differential of less than 5 pounds per square inch is all that is necessary for the successful operation of my process, and therefore I prefer to carry out my process at pressure differentials of from 1 to 5 pounds per square inch. This pressure differential can be obtained by using either a positive fluid or static pressure, or as an alternative a vacuum filtration arrangement can be employed. Since this sludge contains the active metals sodium and calcium it is necessary to protect the sludge by a blanket of inert gas such as nitrogen, and it is therefore convenient to utilize nitrogen pressure as the means of establishing this pressure differential across the filter medium. Under the conditions as specified above the filtration occurs readily and the filtrate consisting of substantially pure molten sodium is collected and can be drawn off and placed in storage vessels, cast or extruded into usable forms or received into shipping containers. The filter cake is periodically or continuously removed from the filter medium and since this cake is rich in calcium it can be further treated by conventional methods so as to obtain high grade calcium crystals. One such mode of treatment consists of treating this cake with an alcohol so as to selectively react the residual sodium in the cake to form alcoholate and thereby permit the recovery of pure calcium crystals.

My process can be conveniently performed in any suitable filtration apparatus which includes a vessel or container having provision for a perforated wall or screen through which to accomplish the filtration. It should be pointed out, however, that while the general structure of the apparatus is not critical it is important to utilize a filter medium having openings which are within the size range specified above. An apparatus which I have found to be well adapted for my process comprises a metal filtration pot having provision at the bottom thereof for a filter screen. A suitable cap is provided and provision is also made for admitting nitrogen pressure to the interior portion of the pot so that the filtration can be carried out under slight pressure. The entire filtration apparatus can be immersed in a heated oil bath utilizing a mineral oil of relatively low viscosity. One advantage obtained in using an oil bath is that a relatively constant filtration temperature is maintained. Another advantage to the use of an oil bath is that the sodium filtrate is collected below the surface of the oil so that the metallic sodium is protected from atmospheric contamination and moisture. When continuous operation is desired I have found that a conventional rotary filter is well suited to my process. In such a case the heated sludge or mixture is continuously fed to the rotating filter drum. The filtrate is collected and withdrawn, and the filter cake is removed from the filter medium continuously by means of a doctor blade. This cake is then collected and moved out of the system by suitable means such as a screw-type conveyor.

As indicated above either fluid or static pressure can be applied for the purpose of assisting the filtration. When static pressure is used as in the filtration pot of the above example, I have found that it is convenient to employ a steel disc which is adapted to be weighted and depressed upon the filter cake so as to maintain the desired pressure.

My invention can perhaps best be understood by reference to the following working examples in which the process of my invention is applied to the recovery of sodium from the sodium-calcium electrolytic sludge produced as a by-product in the manufacture of sodium. In these examples all proportions and percentages given are on the weight basis.

Example I

A charge of 607 parts of electrolytic sludge obtained from the manufacture of sodium and containing approximately 70 per cent metallic sodium in admixture with calcium crystals was placed in a metal filter pot equipped with a U. S. standard 16 mesh screen at its base. This standard screen has sieve openings that measure 0.0469 inch across. The cap of the filter pot was secured in place and the entire apparatus immersed in an oil bath maintained at a temperature of 120° C. Nitrogen pressure of 1 pound per square inch gauge was maintained on the charge and filtration occurred readily. A filtrate of molten sodium was collected, weighed and analyzed and found to contain 56% of the sodium originally present in the sludge. The calcium content of this sodium filtrate was observed to be 3.5%. An overall material balance showed that 236 parts filtrate had been obtained and 371 parts of cake remained on the filter screen.

Example II

The apparatus as described in Example I was charged with 598 parts of the electrolytic sludge, and the filtration carried out as in Example I except that the oil bath was maintained at 130° C., and during filtration the cake resting upon the filter screen was gently tamped down four times using a flattened ladle as the tamping means. This tamping was done merely for the purpose of smoothing the cake so as to eliminate channeling. In most cases, however, tamping is not necessary for the successful operation of my process. Based on an original metallic sodium content of 70% in the sludge 55% of the sodium was recovered as filtrate, and this recovered sodium contained only 1.6% calcium.

Example III

A charge of 967 parts of the electrolytic sludge was placed in a filter pot similar to that described in Example I with the exception that a U. S. standard 8 mesh screen in which the sieve openings measure 0.0937 inch across was employed as the filter medium and provision was made for applying static pressure to the charge by means of a weighted steel disc. This apparatus was immersed in an oil bath maintained at a temperature of 110° C. and the steel disc was depressed upon the charge so as to maintain a static pressure of 4.8 pounds per square inch. The filtration occurred readily and the filtrate was collected, weighed and analyzed. Based on an original metallic sodium content of 70%, 82% of the sodium was recovered as filtrate, and this filtrate contained only 2% calcium. An overall material balance showed 556 parts of filtrate was collected and 401 parts of cake remained on the screen.

Example IV

A charge of 1175 parts of electrolytic sludge was placed in the filter pot described in Example I utilizing a U. S. standard 16 mesh screen as the filter medium. A filtrate collecting pot having provision for evacuation was secured to the base of the filter pot and the entire apparatus immersed in an oil bath maintained at a temperature of 110° C. The filtrate collecting pot was evacuated to approximately 400 mm. of mercury and the filtration proceeded relatively smoothly. During the filtration the cake was gently tamped down three times as described in Example II. Molten sodium was collected as filtrate and based on an original metallic sodium content of 70% in the sludge charge, 81% of the sodium was recovered as filtrate containing only 3.6% calcium. An overall material balance showed 667 parts of filtrate were collected and 508 parts of cake remained on the screen.

As can be seen from the foregoing description and working examples, I have provided an improved and economical process for recovering sodium from mixtures in which it occurs with alkaline earth metal particles or crystals. My recovery process can be operated successfully using very moderate conditions of pressure so that the use of expensive heavy pressure equipment is eliminated. Furthermore, by my improved process it is possible to economically recover substantial amounts of sodium from the electrolytic sludge that is produced as a by-product in the manufacture of sodium and thereby effect a recovery which has heretofore represented a major problem in the electrolytic sodium process.

While I have described the process of my invention as applied to the recovery of sodium from the electrolytic sludge, my process can be applied with equal success to other mixtures which contain alkali metal and alkaline earth particles or crystals. I therefore do not intend that my invention be limited to the specific embodiments and working examples disclosed herein and I intend by the appended claims to cover all modifications within the spirit and scope of my invention.

I claim:

1. A process for recovering sodium from the sludge obtained as a by-product in the manufacture of alkali metal by the electrolysis of fused salt mixtures and containing calcium crystals the major diameters of which vary in size, comprising heating said sludge to a temperature between 110 and 130° C., filtering said mixture at said temperature through a filter medium across which is maintained a pressure differential no greater than 20 pounds per square inch, said filter medium having openings which are at least 5 times larger than the major diameter of the smallest of said crystals but smaller than the major diameter of the largest of said crystals, and collecting the filtrate thereby obtained.

2. In a process for recovering relatively pure sodium from the sludge obtained as a by-product in the manufacture of sodium by the electrolysis of a fused mixture of sodium and calcium chlorides, said sludge containing calcium crytals, the major diameters of which vary in size, the steps of heating said sludge to a temperature between 110 and 130° C., filtering the heated sludge at said temperature through a filter having sieve openings which measure from 0.0469 to 0.0937 inches across, effecting the filtering at pressure differential no greater than 20 pounds per square inch to cause molten sodium containing only a small amount of calcium to pass through the sieve openings, and collecting the filtrate.

References Cited in the file of this patent

UNITED STATES PATENTS

| Number | Name | Date |
|---|---|---|
| 2,124,564 | Gilbert | July 26, 1938 |

OTHER REFERENCES

"Principles of Mineral Dressing" by Gaudin, pages 489, 490, 1st ed., 1939.

"Chemical Engineers Handbook" edited by J. H. Perry, page 1657, 2nd ed. 1941.